United States Patent [19]
Ritchie et al.

[11] 3,897,148
[45] July 29, 1975

[54] OPTICAL SCANNING SYSTEM

[75] Inventors: Robert T. Ritchie, Lexington, Ky.; James C. Rogers, Boulder, Colo.

[73] Assignee: International Business Machines Corporation, Armonk, N.Y.

[22] Filed: Nov. 29, 1973

[21] Appl. No.: 420,338

[52] U.S. Cl. ........................ 355/57; 355/58; 355/60
[51] Int. Cl. ............................................ G03b 27/36
[58] Field of Search ............... 355/8, 47, 51, 55, 56, 355/57, 60, 61, 62, 63, 64, 65, 66

[56] References Cited
UNITED STATES PATENTS

| | | | |
|---|---|---|---|
| 2,464,793 | 3/1949 | Cooke | 354/65 |
| 3,222,982 | 12/1965 | Gelb | 355/51 |
| 3,572,924 | 3/1971 | Matsumoto et al. | 355/60 |
| 3,614,222 | 10/1971 | Post et al. | 355/60 X |
| 3,687,544 | 8/1972 | Muller | 355/60 |
| 3,703,334 | 11/1972 | Knechtel | 355/58 |
| 3,709,602 | 1/1973 | Satomi | 355/57 |
| 3,709,603 | 1/1973 | Furuichi | 355/60 |
| 3,711,199 | 1/1973 | Koizumi | 355/60 |
| 3,778,147 | 12/1973 | Reehil et al. | 355/8 |
| 3,815,991 | 6/1974 | Janssen et al. | 355/8 |

*Primary Examiner*—Samuel S. Matthews
*Assistant Examiner*—Alan Mathews
*Attorney, Agent, or Firm*—John W. Girvin, Jr.

[57] ABSTRACT

A multiple carriage optical scanning system scans a stationary planar object onto a moving photoreceptive surface at a selected one of a plurality of magnification settings and locates the image at a fixed reference position on the photoreceptive surface regardless of the magnification selected. The scanning system includes a reciprocating lens and light source, the velocities thereof in the scanning direction being controlled by the magnification selected. The lens is supported on a lens carriage which locates the lens along its optical axis in accordance with the magnification selected. The lens carriage is supported for reciprocal motion in a scanning direction on a set of guide rails which are mounted on a second carriage which is movable in a direction perpendicular to the scanning direction and to the optical axis. Combined carriage motion effects the positioning of the lens along three coordinate directions to provide the desired magnification and image placement. The lens carriage is thereafter driven by a rotating drive arm which contacts the lens carriage at a radial position on the drive arm which determines the lens velocity. A set of mirrors are employed along the optical path for conjoint movement with the lens for focusing. Velocity and initial position of the light source is controlled by drive cam selection. A common drive source controls the synchronized motions of the photoreceptive surface, the lens and the light source. A second drive source controls the three dimensional positioning of the lens, positioning of the mirrors and drive cam selection.

19 Claims, 14 Drawing Figures

3,897,148

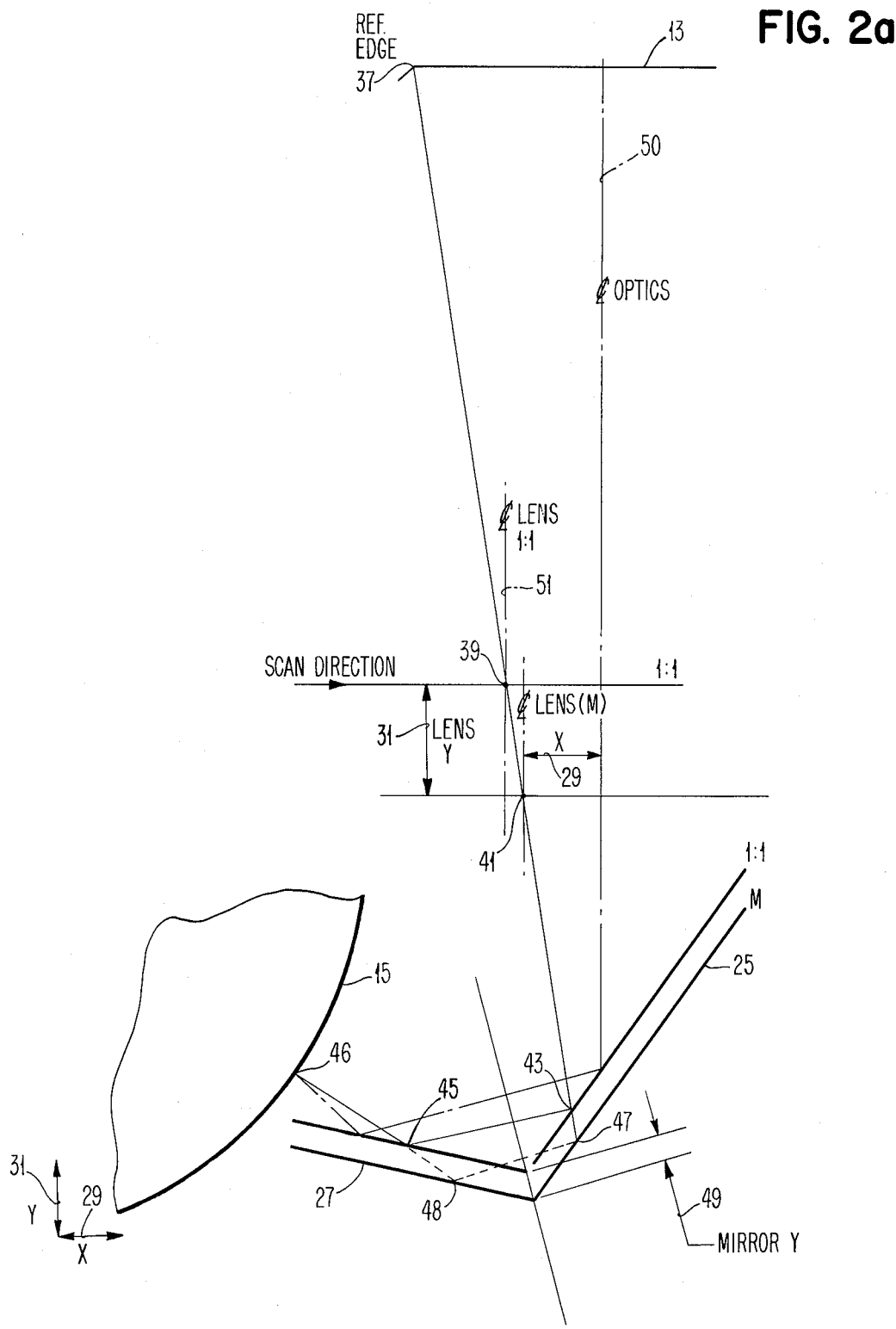

OPTICAL SCANNING SYSTEM

BRIEF BACKGROUND OF INVENTION

1. Field

This invention relates to a multiple carriage optical scanning apparatus and, more particularly, to an optical scanning apparatus which facilitates the reproduction of an object onto a moving photoreceptive surface at one of a plurality of magnification settings.

2. Description of the Prior Art

Various prior art scanning devices have been utilized to project a flowing image of an object onto a moving photoreceptive surface. Expired U.S. Pat. No. 2,464,793 relates to the utilization of a multiple carriage scanning lens system for projecting a stationary object onto a moving photoreceptive surface. Movement of the lens is synchronized with movement of the photoreceptive surface to provide the desired image reproduction. The patent notes that the magnification of the image reproduced is dependent upon the position of the lens along its optical axis. It further notes that the velocity of the lens with respect to that of the photoreceptive member is dependent upon the magnification setting. Thus, in a 1:1 magnification mode where the lens is located half way between the object and the photoreceptive member, the lens moves at half the velocity of the photoreceptive member. For a magnification of n, the ratio of lens velocity to that of the photoreceptive member is given by the formula $(1+1/n):1$.

In the patented system, the lens carriages and the carriage for the photoreceptive member are moved by the rotation of lead screws having a pitch thereon of the desired ratio. No means are provided for readily changing the relative velocities of the carriages with respect to one another nor are means provided for readily changing the position of the lens along its optical axis. Accordingly, one would have to reconstruct the machine in accordance with the well known principles described in order to achieve varying magnifications of the object.

Various reproduction devices have been constructed to automatically vary the position of the lens between an original object and a photoreceptive surface to thereby change the magnification ratio of the system. Such an optical system is disclosed in co-pending application Ser. No. 87,508, filed Nov. 6, 1970, entitled "Optical System Featuring Change In Magnification by Combined Lens and Mirror Motion", Edwin L. Libby and Myrl J. Miller, inventors, assigned to assignee of this application. In this system, the image of a stationary original is projected onto a stationary photoreceptive surface by a stationary lens element. The lens element is positionable along all three coordinate directions in order to change the system magnification without disturbing the position of the image projected onto the photoreceptive member. It is noted that when such a system is utilized, the entire document must be simultaneously projected onto the photoreceptive member in contradistinction to applicants reciprocating scanning system wherein only a portion of the object is projected onto the photoreceptive member at any one time instant.

Various other scanning systems for projecting a portion of an image onto a photoreceptive surface at one of a plurality of magnification settings are well known in the art. These systems generally include an angularly rotating member, the angular velocity of which is controlled to properly synchronize the movement of the scanning member with that of the photoreceptive member. In such systems, a stationary lens is normally employed. The lens may be moved along the optical axis to effect the desired magnification change. However, once the lens is so positioned, it is not thereafter utilized to scan the original onto the moving photoreceptive surface and thus acts in a manner analogous to the lens systems employed in stationary exposure or non-scanning systems. Such prior scanning systems utilizing an angularly rotating scanning element usually cannot be employed to project a planar object onto a moving photoreceptive surface since the distance from the rotating element to the object must be approximately uniform at all times.

SUMMARY OF THE INVENTION

In order to overcome the above noted shortcomings of the prior art and to provide an optical scanning system which scans a stationary planar object onto a moving photoreceptive surface at a selected one of a plurality of magnification settings, the scanning system of the present invention includes a lens carriage which locates the lens along its optical axis at a selected one of a plurality of positions in accordance with the magnification mode selected, the lens carriage being in turn supported for reciprocal motion in a scanning direction on a set of guide rails which are in turn mounted on a master carriage which is movable in a direction perpendicular to the scanning direction and perpendicular to the optical axis. Combined motion of the carriages effects the positioning of the lens along three coordinate positions to provide the desired magnification and to ensure proper placement of the image with respect to the photoreceptor surface.

The lens carriage is engaged by a rotating drive arm at a radial position there along dependent upon the magnification ratio selected. The utilization of such a drive arm system eliminates the necessity of plural drives or variable speed drives to the lens carriage to achieve differing scanning velocities in accordance with the magnification selected.

A scanning illumination system is also utilized in conjunction with the scanning lens, the velocity of the illumination system and the distance of travel thereof being controlled in accordance with the magnification selected.

Accordingly, it is the principle object of the invention to provide an improved multiple carriage optical scanning system incorporating magnification ratio control.

It is a further object of this invention to provide a compact optical scanning system which utilizes a single drive source to effect varying velocities of the scanning element in accordance with its magnification setting.

It is a still further object of this invention to utilize a single drive source to control the three dimensional positioning of the lens system and the selection of the scanning velocity of the illumination system.

The foregoing objects, features, and advantages of the invention will be apparent from the following more particular description of the preferred embodiment of the invention as illustrated in the accompanying drawings.

IN THE DRAWINGS

FIG. 2a is a schematic diagram of the lens and mirror positions in the X-Y plane.

GENERAL DESCRIPTION

Figure 1:
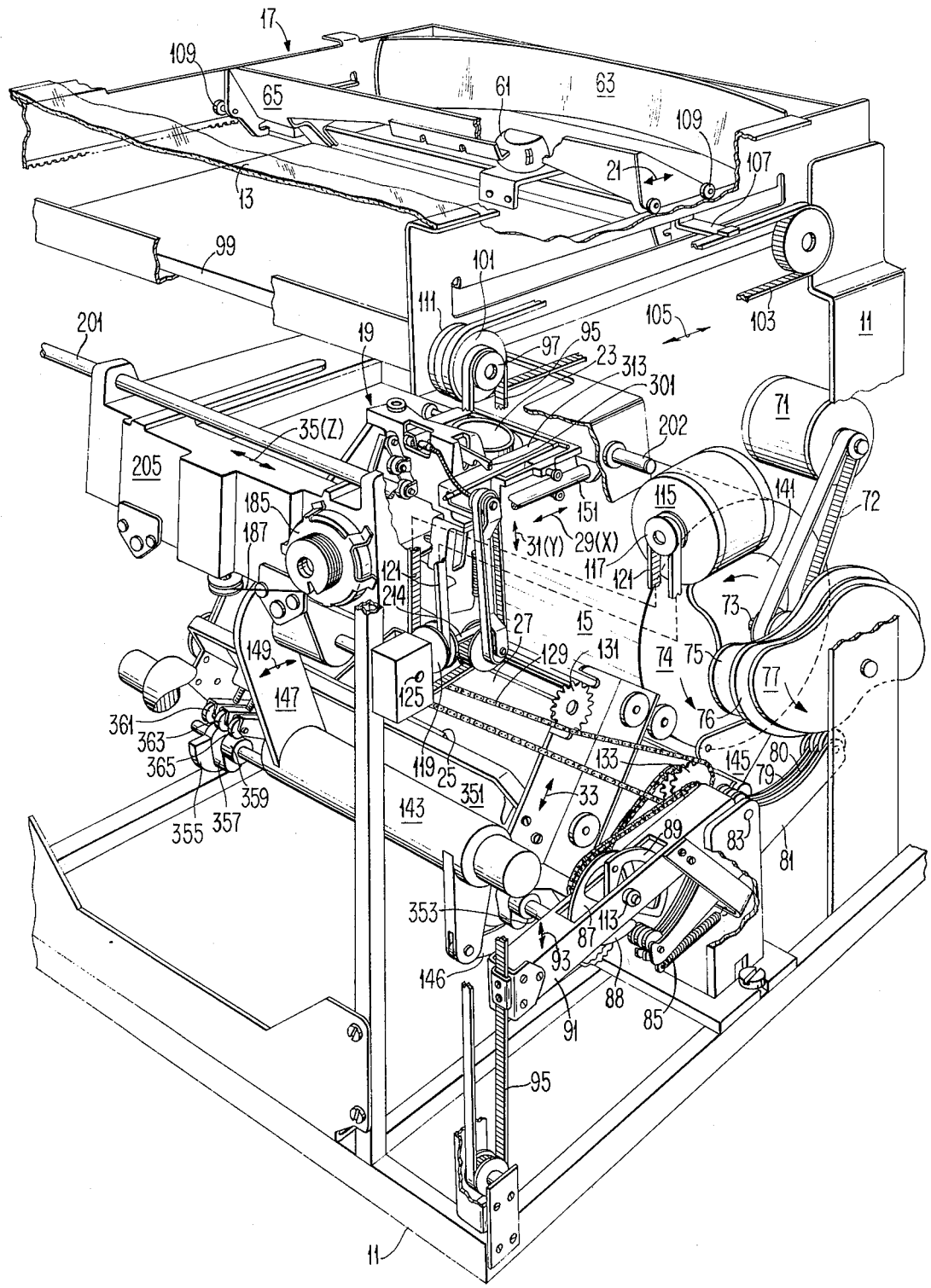
FIG. 1 is a three dimensional illustration of the multiple carriage optical scanning system of the present invention.

Referring now to FIG. 1 of the drawings, a three dimensional illustration of the multiple carriage optical scanning system of the present invention is depicted. The optical scanning system is located within a stationary machine frame 11. A document to be reproduced (not shown) is placed on a planar transparent document support surface 13 which is fixedly secured to the machine frame 11. The optical scanning system projects an image of the stationary document onto a moving photoreceptive surface 15. In the embodiment disclosed, the photoreceptive surface 15 is drum shaped and is mounted for rotary motion past an imaging station whereat an image of the document is received thereon. The photoreceptive surface could comprise, for example, a photoconductive material as is disclosed in U.S. Pat. No. 3,484,237, issued Dec. 16, 1969. Once an image is projected onto such a photoconductive surface, it may thereafter be developed with toner and the toned image transferred to a sheet of paper in accordance with well known electrophotographic techniques as disclosed, for example, in U.S. Pat. No. 3,758,774, issued Sept. 11, 1973.

The multiple carriage optical scanning system which scans a stationary document located on the document support surface 13 onto the rotating photoreceptive surface 15 includes a moving illumination system 17 and a reciprocating lens system 19. The moving illumination system 17 projects a moving line of light onto the surface of the document located on the document support surface 13. The line of light extends across the document support surface 13 in a direction perpendicular to the direction of arrows 21 and moves thereacross in the direction of arrows 21. The line of light is reflected from the document surface to various optical components to be described which project the thusly reflected image of the document onto the photoreceptive surface 15. Movement of the line of light in the direction of arrows 21 is synchronized with the movement of the photoreceptive surface 15 to facilitate the projection of a flowing image onto the photoreceptive surface 15.

The reciprocating lens system 19 include a lens 23 which receives light reflected from the document surface and projects an image thereof to a stationary mirror 25. The thusly projected image is reflected from the stationary mirror 25 onto a stationary mirror 27 from which it is reflected onto the moving photoreceptive surface 15 at an imaging station. In order to project a flowing image of the original document onto the moving photoreceptive surface 15, the lens 23 is reciprocated in the direction of arrows 29 in accordance with the well known optical principles as described in the aforereferenced U.S. Pat. No. 2,464,793.

As described heretofore, it is often desirous to change the magnification ratio of the optical system in order to reproduce reduced size copies or enlarged size copies of the original document. In accordance with well known optical principles, such a change in the magnification ratio of the optical system may readily be obtained by effecting movement of the lens 23 along its optical axis in the Y direction of arrows 31. When such repositioning of the lens occurs, the optical system is no longer focused. In order to refocus the system, it is necessary to either change the lens or to change the conjugate path of the optical system. In the present system, the conjugate path of the optical system is changed by effecting conjoint motion of the stationary mirrors 25 and 27 in the direction of arrows 33.

Assuming that an original document located on the document support surface 13 remains stationary when the system magnification ratio is changed by movement of the lens 23 in the direction of arrows 31 and by conjoint movement of mirrors 25 and 27 in the direction of arrows 33, the location of the image of the document on the photoreceptive surface 15 would be displaced along the axial dimension of the photoreceptive surface 15 as well as along its circumferential direction. In order to compensate for such a shift of the "reference corner" of the image projected by lens 23, the lens is also moved in the X direction of arrows 29 and in the Z direction of arrows 35 conjointly with its movement in the Y direction of arrows 31. In addition, the final position and velocity of the line of light projected by the moving illumination system 17 is changed.

Referring now to FIG. 2A of the drawings, a schematic diagram of the lens and mirror positions in the X-Y plane is depicted. The reference edge 37 of a document placed on the document support surface 13 is viewed by the lens when the center line of the lens is located at point 39 when in a 1:1 magnification mode and when the lens center line is located at point 41 when in a reduction magnification mode. The light ray passing from the reference edge 37 through the lens at point 39 strikes the mirror 25 at point 43 and is reflected therefrom to the mirror 27 at point 45 and is thereafter reflected from the mirror 27 to the photoreceptive surface 15 at point 46. Light emanating from the reference edge 37 passes through the lens when located at point 41 and strikes the mirror 25 at point 47. The light ray is reflected from the mirror 25 to point 48 of the mirror 27 and thence to the photoreceptive surface 15 at point 46. Thus, light emanating from the reference edge 37 strikes point 46 when the lens and optical system is set for a 1:1 magnification and when the lens and optical system is set at a reduction position. This is achieved by moving the center line of the lens in the X direction of arrows 29, by conjointly moving the lens along its optical axis in the Y direction of arrows 31 and by conjointly moving the mirrors 25 and 27 in the mirror Y direction of arrows 49.

Assuming that the document resting on the document glass is 8.5 inches wide in the X direction, the optical center line 50 is located 4.25 inches from the reference edge 37. When in the 1:1 magnification mode, the lens which travels one half the distance of the document width has its center line 51 located 2.125 inches from the optical center line 50. Additionally, the vertical center of the lens is located midway in the optical path between the document support surface 13 and the point 46. When it is desirous to reduce the size of the image by a magnification ratio of M, the following table sets forth the position of the lens when viewing the reference edge 37 and the position of the mirrors 25, 27 in inches.

TABLE I

| M | X (inches) | Y (inches) | Mirror Y (inches) |
|---|---|---|---|
| .74 | 1.81 | 3.25 | .45 |
| .647 | 1.67 | 4.99 | .95 |

Figure 2B:
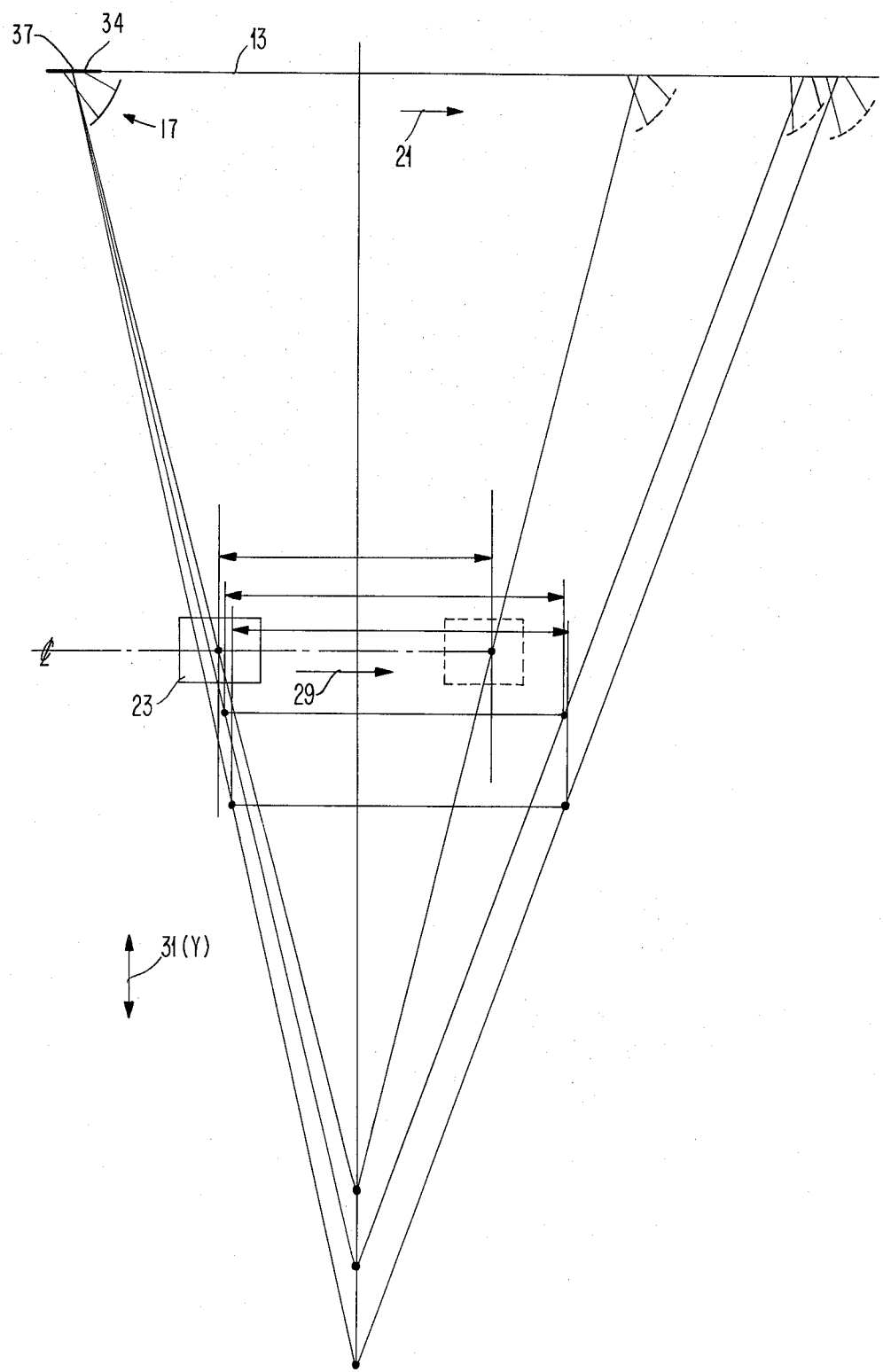
FIG. 2b is a schematic diagram of the lens and moving illumination system positions in the X-Y plane.

Referring now to FIG. 2B of the drawings, a schematic diagram of the lens and moving illumination system positions in the X–Y plane is depicted. The moving illumination system 17 projects a 0.7 inch wide band of light 34 onto the document support surface 13. In the 1.01:1 magnification mode, the moving illumination system 17 travels in the direction of arrow 21 for a distance of 8.8 inches. When in the 0.74 magnification mode, the moving illumination system 17 travels a distance of 11.3 inches and when in the 0.647 mode, the moving illumination system 17 travels a distance of 11.8 inches. The scanning velocity of the moving illumination system for a system in which the photoreceptive member is moving at a constant velocity of 20 inches per second is set forth in the following table.

TABLE II

| M | Velocity (inches/second) |
|---|---|
| 1.01:1 | 19.8 |
| .74 | 27.02 |
| .647 | 30.91 |

The lens 23 moves in the direction of arrow 29 in synchronism with movement of the moving illumination system. The following table sets forth the velocity of the lens in the scanning direction during the constant velocity portion of the scan for an assumed photoreceptive member speed of 20 inches per second:

TABLE III

| M | Velocity (inches/second) |
|---|---|
| 1.01:1 | 9.95 |
| .74 | 11.49 |
| .647 | 12.14 |

When in the 1.01:1 magnification mode, the lens travels a distance of 5.235 inches in the direction of arrow 29. The constant velocity portion of this travel is approximately 4.6 inches. When in the 0.74 reduction mode, the total travel of the lens 23 is 6.05 inches and when in the 0.647 reduction mode, the total lens travel is 6.39 inches.

Figure 2C:
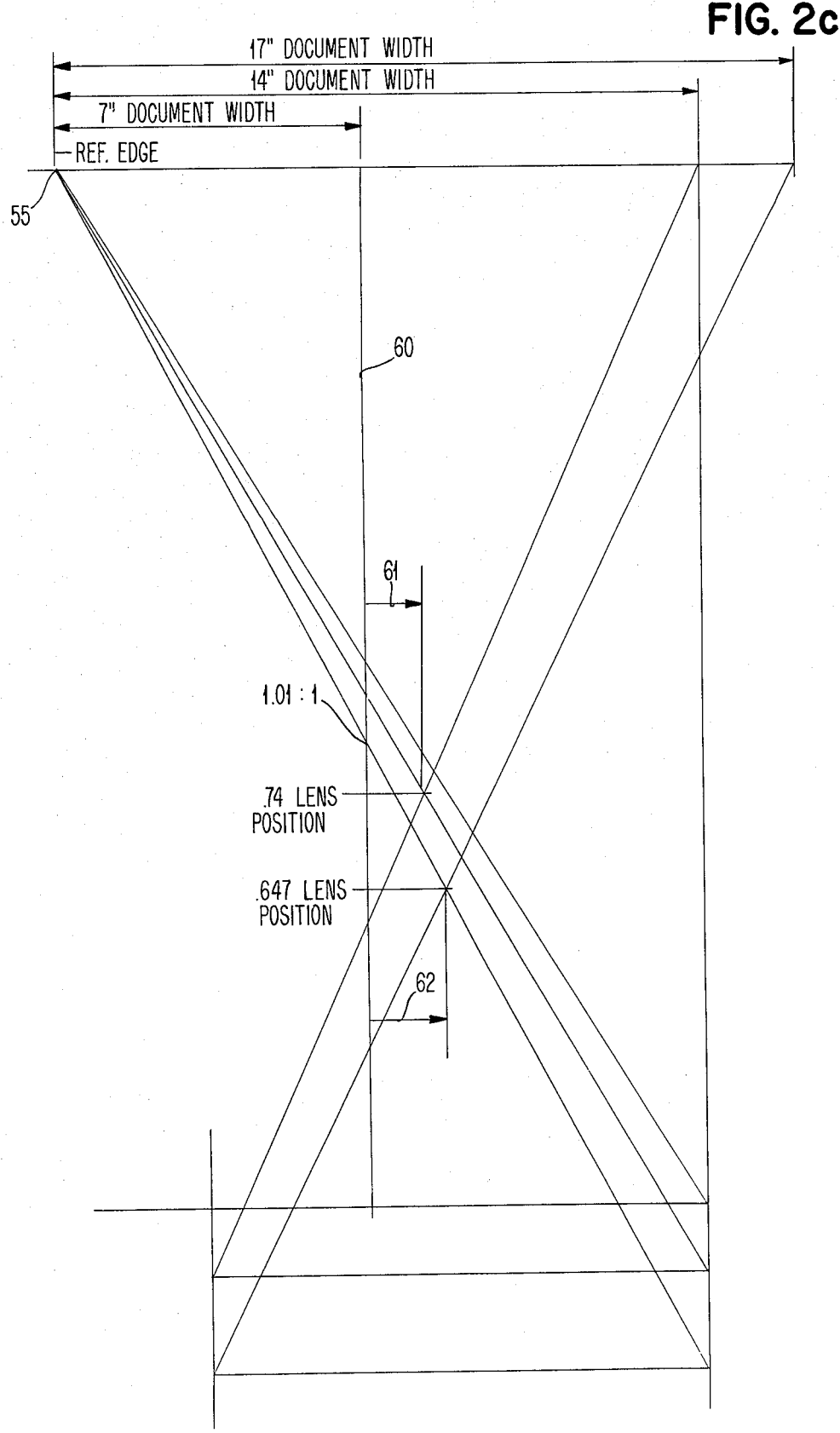
FIG. 2c is a schematic diagram of the lens positions in the Y-Z plane.

Referring now to FIG. 2C of the drawings, a schematic diagram of the lens positions in the Y–Z plane is depicted. The reference edge 55 is perpendicular to the reference edge 37 of FIGS. 2A and 2B and forms a reference "corner" therewith. The optical centerline 60 is located seven inches from the reference edge 55. The lens is located on the optical centerline 60 when in the 1.01:1 magnification mode and is located 1.066 inches therefrom in the Z direction of arrow 61 when in a .74 magnification mode and 1.514 inches from the optical centerline 60 in the Z direction of arrow 62 when in the .647 magnification mode. The image plane is shown displaced in the Y direction in accordance with the lens position, it being understood that the displacement is compensated for by mirror motion as described with respect to FIG. 2a.

Figure 2D:
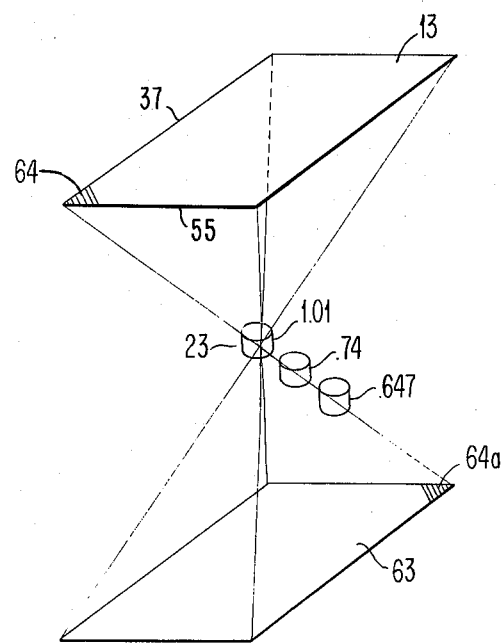
FIG. 2d is a three dimensional schematic diagram of the lens positions in the X-Y-Z planes.

Referring now to FIG. 2d of the drawings, a three dimensional schematic diagram of the lens positions in the X–Y–Z planes is depicted. The lens 23 projects an image of an object placed on the document support surface 13 to an image plane 63. In each of the three lens positions, the reference corner 64 is projected to the reference corner 64a of the image plane. The reference corner is formed by the reference edges 37 and 55.

DETAILED DESCRIPTION
ILLUMINATION SYSTEM

Referring once again to FIG. 1 of the drawings, it has been heretofore noted that the multiple carriage optical scanning system includes a moving illumination system 17. The moving illumination system 17 projects a line of light onto a document surface resting on document support surface 13, the line of light moving in the direction of arrows 21 in synchronism with movement of the lens 23 and the photoreceptive surface 15. The optical arrangement of the elements comprising the moving illumination system 17 are described in detail in the aforereferenced U.S. Pat. No. 3,758,774. As described therein, light is projected from a stationary high intensity illumination lamp 61 onto a stationary paraboloid reflector 63. The illumination lamp 61 is located at the foci of the paraboloid reflector. Hence, light rays striking the paraboloid reflector 63 are reflected therefrom in a parallel bundle of light rays which strike the reflective surface (not shown) of a moving reflector 65. The moving reflector 65 is parabolic in cross-section and cylindrical along its axial dimension forming a parabolic cylinder surface. The parallel light rays thus striking the moving reflector 65 are reflected therefrom toward the foci of the parabola formed thereby which is located at the document support surface 13. Since the moving reflector 65 is cylindrical along its axial dimension and parabolic in cross-section at any point along its axial dimension, a highly focused line of light or band of light is thus produced at the document support surface. As the moving reflector 65 is moved in the direction of arrows 21, the entire line of light moves in the same direction along the document support surface 13. When a document is located on the document support surface 13, the band of light is reflected therefrom toward the lens 23 whereat it is projected onto the photoreceptive surface 15. The moving reflector 65 is shaped so that more light is reflected from the side or edge portions thereof than from the center portion thereof to compensate for the well known light fall-off characteristics of the lens 23.

As noted heretofore, the moving reflector 65 and hence the line of light travel in synchronism with movement of the photoreceptive surface 15 and in synchronism with movement of the lens 23. A common drive source 71 is utilized to drive the three systems in synchronism. The drive source 71 effects rotary motion of the photoreceptive surface 15 through the belt 72 and shaft 73 which is pinned to the drum 74.

The rotary motion of the shaft 73 is translated into reciprocal motion of the moving reflector 65 through a drive system which includes the scanning cams 75, 76 and 77 which are pinned to the shaft 73. The scanning cams 75, 76 and 77 driven their respective cam follower arms 79, 80 and 81 which pivot about shaft 83. Each of the cam follower arms 79–81 are spring biased by springs such as spring 85 into contact with their associated scanning cam.

The motion of a selected one of the cam follower arms 79–81 is transmitted through its corresponding rotary interposer 87–89 to the rocker arm 91 which thus rocks in the direction of arrows 93. Motion of the rocker arm 91 effects corresponding translation motion of belt 95 attached thereto which rotates the upper pulley 97. The pulley 97 is pinned to the shaft 99 which also has pulley 101 and a corresponding pulley (not shown) at the opposite end of shaft 99 secured thereto. Rotary motion of pulley 101 effects motion of belt 103 in the direction of arrows 105. A corresponding belt (not shown) is located on the opposite side of the frame 11. The moving reflector 65 is fixedly secured to the belt 103 by a member 107 and to the belt (not shown) by a corresponding member (not shown). Movement of the belt 103 in the direction of arrows 105 thus imparts motion to the moving reflector 65 in the direction of arrows 21. The moving reflector 65 is mounted on rollers 109 so that it freely moves in the direction of arrows 21. The clock spring 111 secured to shaft 99 loads the moving illumination system against the selected driving scanning cam 75, 76 and 77.

As noted heretofore, both the velocity and the final position of the moving reflector 65 must be controlled in accordance with the magnification selected. Accordingly, each of the scanning cams 75, 76 and 77 are cut with a profile to effect a desired velocity and final position (length of travel) of the moving reflector 65. In the system illustrated, three magnification modes may be selected. Accordingly, scanning cam 75 is utilized when in a first magnification mode, scanning cam 76 being utilized when in a second magnification mode, and scanning cam 77 being utilized when in a third magnification mode. Since each of the scanning cams are pinned to the shaft 73 and rotate therewith, all of the cam follower arms 79, 80 and 81 pivot about shaft 83 whenever rotary motion is imparted to the shaft 73 by the drive source 71. In order that the motion of only one of the cam follower arms be utilized to control the reciprocal motion of the rocker arm 91 and hence that of the moving reflector 65, three rotary interposers 87, 88, and 89 are employed to effect cam follower arm selection. The rotary interposers are each pinned to shaft 113 and are rotated as a unit therewith.

Figure 3:
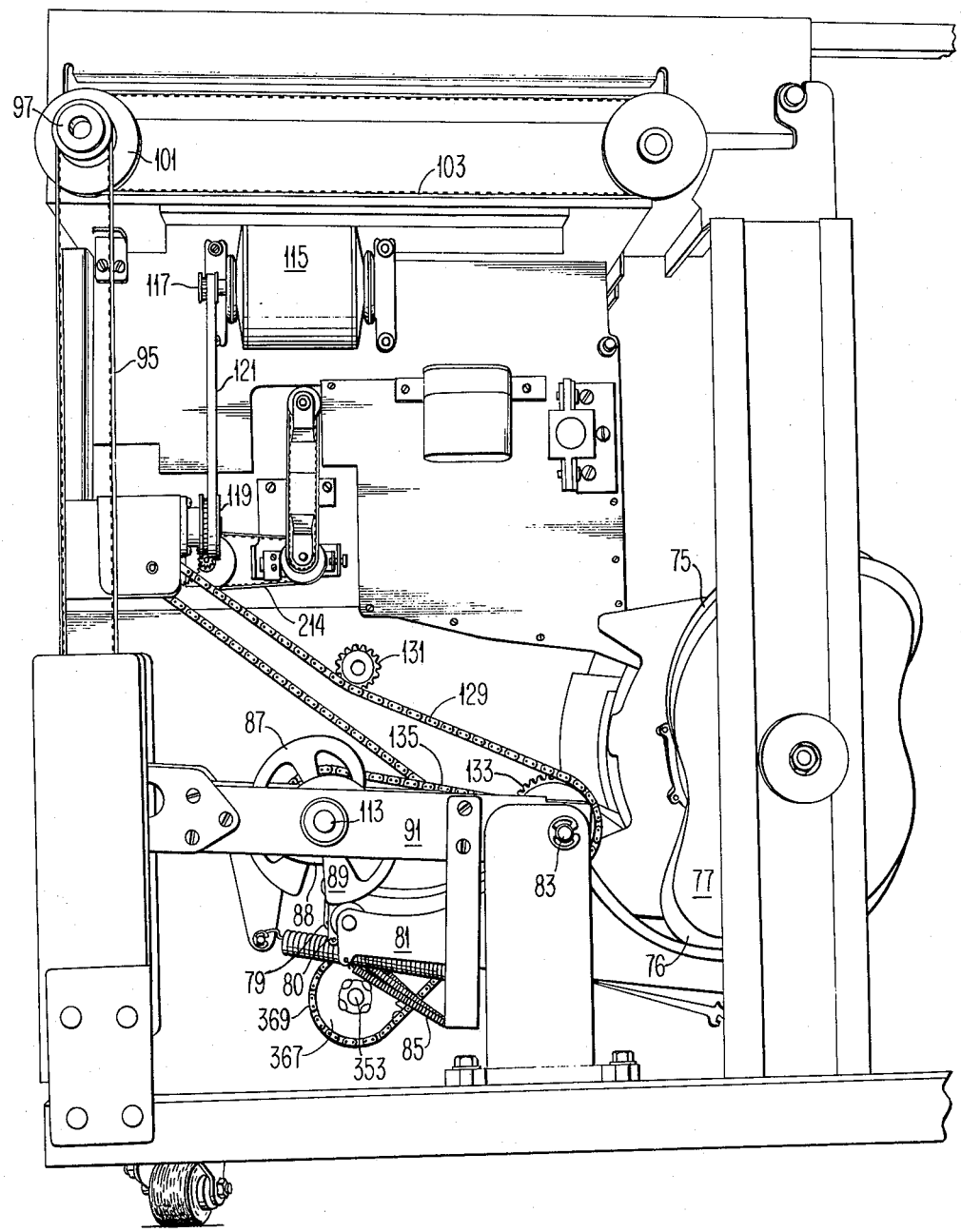
FIG. 3 is a side view of the illumination drive assembly.

Referring to FIG. 3 of the drawings, a side view of the illumination drive assembly is depicted. As depicted, shaft 113 has been rotated so that the rotary interposer 89 is contacting its corresponding cam follower arm 81 while the rotary interposers 87 and 88 are displaced from their corresponding cam follower arms 79 and 80. Accordingly, only the motion of the scanning cam 77 is transmitted to the rocker arm 91 through its associated cam follower arm 81 and rotary interposer 89. This motion is then transmitted through belt 95 to the upper pulley 97, the pulley 101, and the belt 103 to the moving reflector (not shown).

The rotational position of shaft 113 thus determines the selection of the scanning cam 75–77 which controls the velocity and travel distance of the moving reflector. The rotational position of the shaft 113 is controlled by the actuation of the reversible motor 115.

Figure 4:
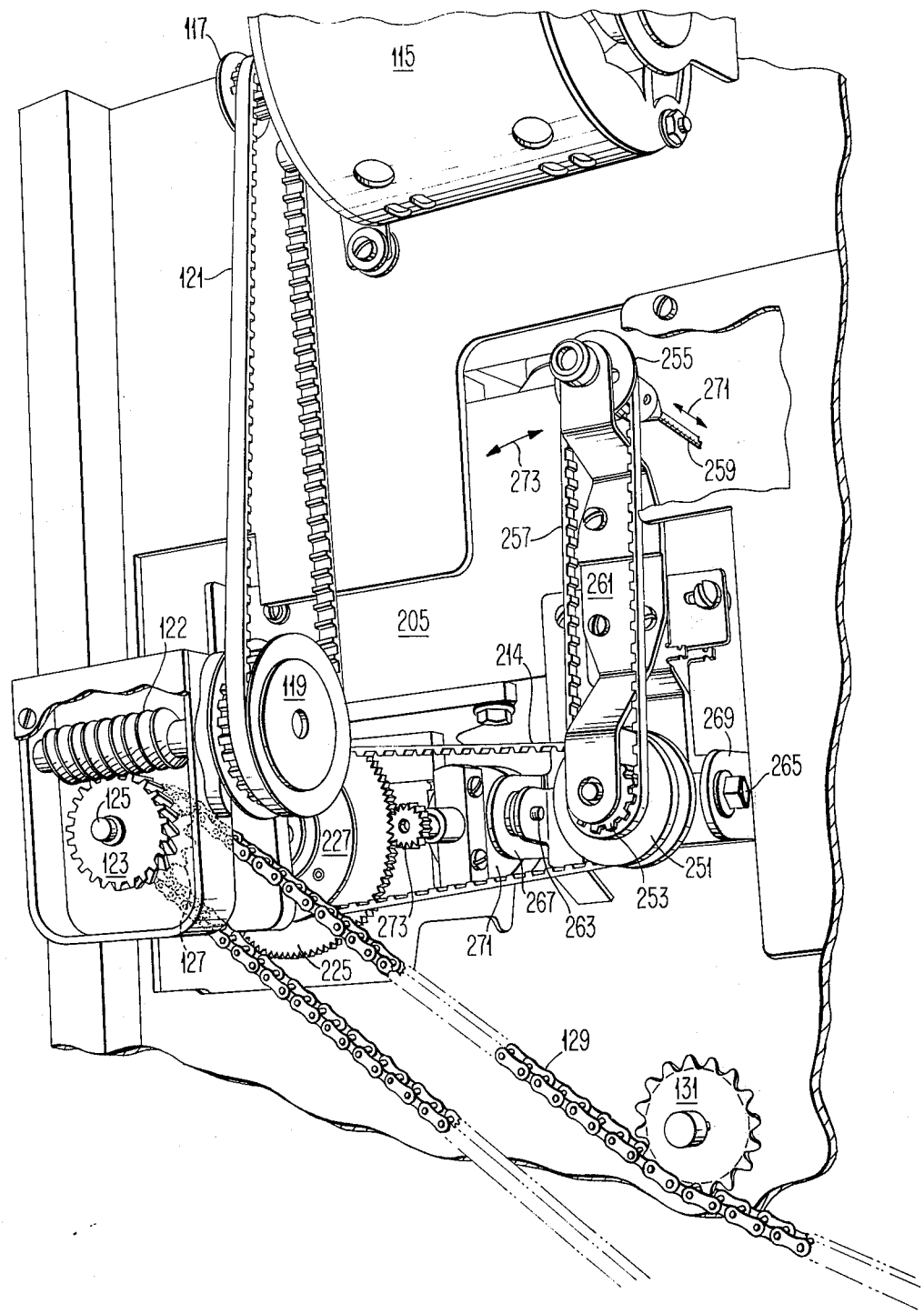
FIG. 4 is a detailed view of a portion of the magnification control drive system.

The reversible motor 115 is connected to the shaft 113 through the pulley belt and chain drive system described in the immediately following section. Rotation of the output pulley 117 of the reversible momtor 115 effects rotation of the pulley 119 through the belt 121. Referring briefly to FIG. 4 of the drawings, a detailed view of a portion of the magnification control drive system is depicted. Rotation of the pulley 119 drives the worm 122 effecting rotation of the worm gear 123, the shaft 125, and the chain sprocket 127. Rotation of the chain sprocket 127 effects movement of the drive chain 129 thereabout.

Referring once again to FIG. 3, the drive chain 129 moves past idler sprocket 131 and travels about driven sprocket 133. Rotation of the driven sprocket 133 effects corresponding rotation of a similar sprocket on the same shaft as the driven sprocket 133 (not shown) which in turn effects movement of the chain 135. The chain 135 travels about a sprocket (not shown) pinned to the shaft 113 thereby effecting rotary motion of the shaft 113.

Accordingly, when it is desirous to select a different one of the magnification modes, the reversible motor 115 is energized to effect rotation of the shaft 113 thereby causing one of the rotary interposers 87–89 to contact its associated cam follower arm 79–81. This selection control selects which one of the scanning cams 75–77 is utilized to impart linear motion to the belt 103 and hence to the moving reflector 65 of FIG. 1.

LENS CARRIAGE SYSTEM

Referring once again to FIG. 1 of the drawings, it has been described how the drive source 71 effects the synchronized movement of the photoreceptive surface 15 and the moving reflector 65. The drive source 71 also effects the synchronized movement of the reciprocating lens system 19 with the photoreceptive surface 15. Additionally, it has been described how the output position of the reversible motor 115 controls the selection of a scanning cam 75–77 which in turn controls the velocity and length of travel of the moving reflector 65. The output position of the reversible motor 115 also controls the initial positioning of the multiple carriages comprising the reciprocating lens system 19 in the direction of arrows 29, 31, and 35 and further controls the positioning of the stationary mirrors 25 and 27 in accordance with the magnification mode selected.

The synchronized reciprocal motion of the lens 23 with the movement of the photoreceptive surface 15 is achieved through the lens cam 141 mounted on the shaft 73. Movement of the lens cam 141 is translated into rotary mottion of the drive shaft 143 through a cam follower 145 and the connecting link 146. Rotary motion of the drive shaft 143 causes the drive arm 147 pinned thereto to rotate therewith in the direction of arrows 149. The rotating movement of the drive arm 147 effects reciprocal motion of the lens 23, this motion being constrained to linear motion by the guide 151 and a corresponding guide (not shown).

Figure 5:
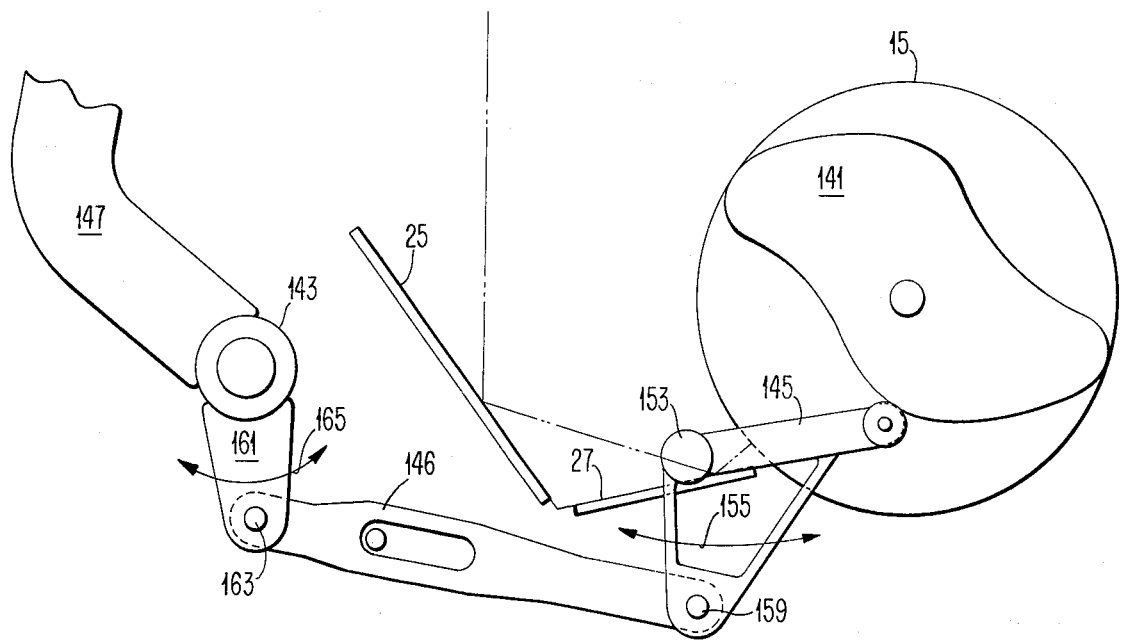
FIG. 5 is a schematic view of the reciprocating lens drive assembly.

Referring now to FIG. 5 of the drawings, a schematic view of the reciprocating lens drive assembly is depicted. As previously noted, motion is imparted by the lens cam 141 to the cam follower 145 which pivots about pivot 153 in the direction of arrows 155. The connecting link 146 is pinned to the follower 145 by the pin 159 and is pinned to the arm 161 by the pin 163. Motion of the cam follower 145 in the direction of arrows 155 thus imparts corresponding rotary motion to the arm 161 in the direction of arrows 165 through the connecting link 146. The arm 161 is fixedly secured to the drive shaft 143 thereby effecting the rotational movement thereof. As noted heretofore, the drive arm 147 is fixedly secured to the drive shaft 143 and rotates therewith. The drive arm 147 in turn acts upon a lens carriage assembly (not shown) to which the lens element (not shown) is secured to effect the reciprocal motion thereof.

Figure 6:
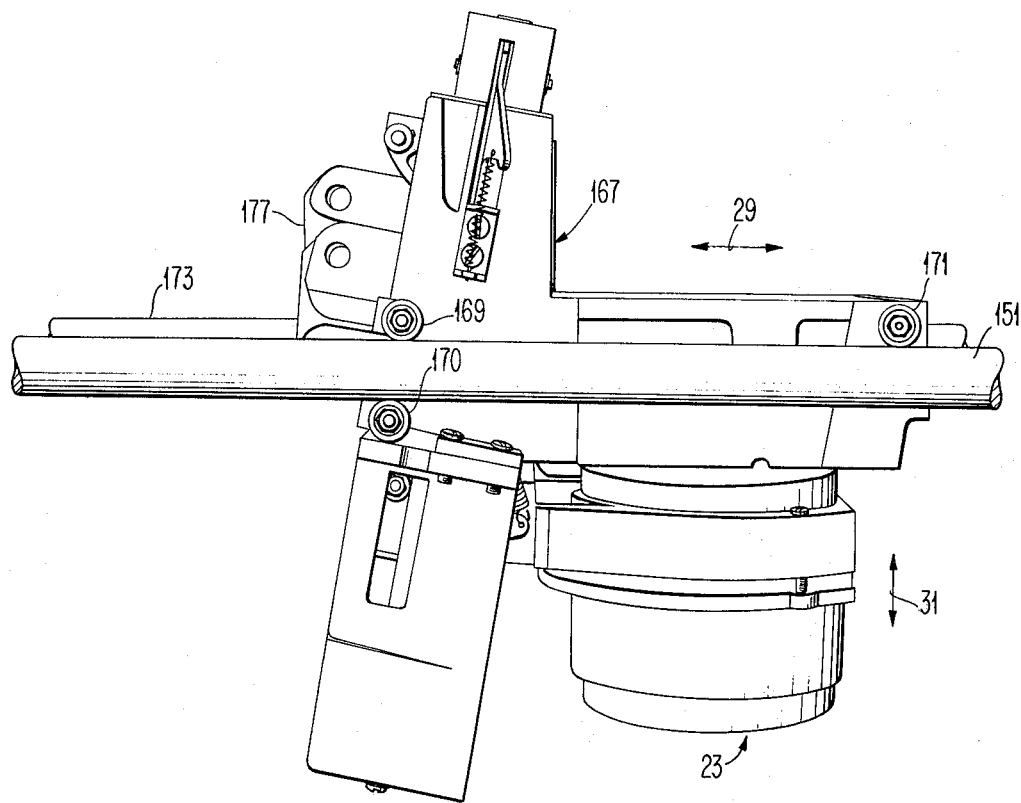
FIG. 6 is a side view of the lens carriage and subcarriage assembly.

Referring now to FIG. 6 of the drawings, a side view of the lens carriage and sub-carriage assembly is depicted. The lens carriage assembly 167 includes roller members 169, 170, and 171 which ride on the guide 151 and corresponding roller members (not shown) on the opposite side thereof which ride on the parallel guide 173. The lens carriage assembly is thus ready to translate in the direction of arrows 29 thereby carrying the lens 23 therewith. Reciprocal motion in the direction of arrows 29 is effected by the drive arm 147 of FIG. 5 which acts upon one of three roller surfaces (not shown) located adjacent to the surface 177.

Figure 7:
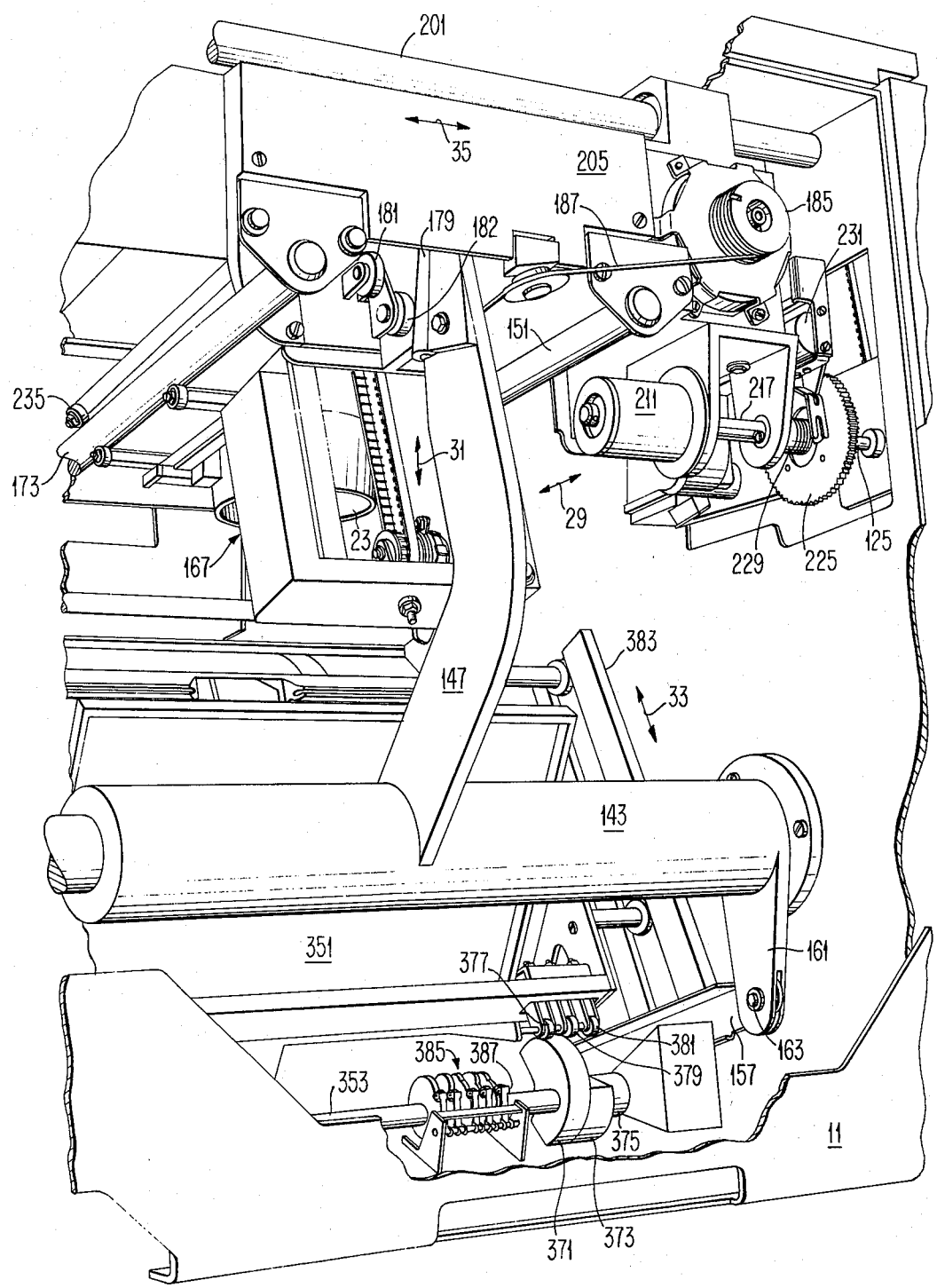
FIG. 7 is a rear view of the lens carriage assembly.
Figure 8:
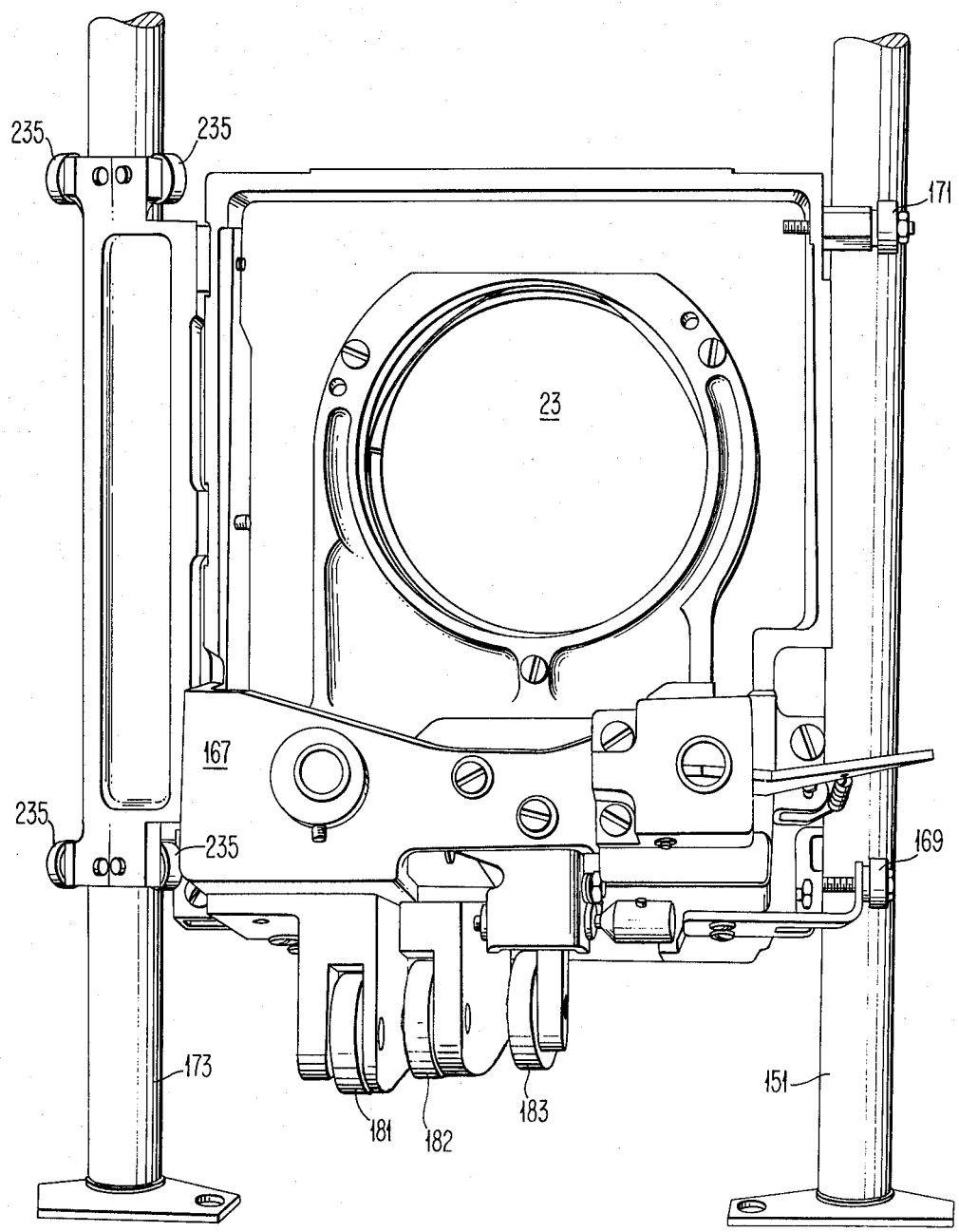
FIG. 8 is a top view of the lens carriage assembly.

Referring briefly to FIG. 7 of the drawings, a rear view of the lens carriage assembly is depicted. The upper portion of the drive arm 147 includes a roller surface 179 which acts upon the drive surfaces of either roller 181, 182 or 183 (FIG. 8). Since the drive arm 147 rotates at a fixed angular velocity and engages the lens carriage 167 at a different radial position thereon depending upon which surface 181, 182 or 183 it acts upon, the lens carriage is driven thereby at differing linear velocities in the direction of arrows 29.

Referring once again to FIG. 1 of the drawings, a clock spring 185 acting through cable 187 loads the lens carriage assembly 167 of FIG. 6 against the drive arm 147 so that the lens cam 141 provides drive power to the lens carriage during a rescanning stroke and the spring 185 drives the lens carriage during a scanning stroke.

The clock spring 185 and the clock spring 111 which is associated with the scanning illumination system are operated 180° out-of-phase with each other. Thus, when the lens cam 141 is providing power to effect the rescanning motion of the lens, the clock spring 111 is providing the rescanning energy to the moving reflector 65. When the selected scanning cam 75–77 is providing energy to effect the scanning motion of the moving reflector 65, the clock spring 185 is providing the requisite energy to effect the scanning motion of the lens 23. The lens cam is thus scanning in an uphill direction while the selected scanning cam is scanning in a downhill direction. The utilization of such out-of-phase driving cams averages the torque load on the drive source 71 thereby providing for virtually uniform velocities of the moving reflector 65 and the lens 23.

As noted heretofore, the output position of the reversible motor 115 controls the initial positioning of the multiple carriages comprising the reciprocating lens system 19 in the direction of arrows 29, 31 and 35. Although all of the multiple carriages are positioned and simultaneously by the reversible motor 115, the following description will relate to the positioning of the multiple carriages in each direction individually for the purposes of clarity.

The multiple carriage assembly of the reciprocating lens system 19 translates in the Z direction of arrows 35 over the parallel mounted guide rails 201, 202 which are fixedly secured to the machine frame 11. Movement of the multiple carriage assembly is achieved by moving the master carriage 205 which carries with it the lens carriage assembly 167 of FIG. 6 as will be described hereinafter. It is noted that the master carriage assembly 205 includes the guide 151 and the guide 173 of FIG. 6. Motion is imparted to the master carriage 205 to move over the guide rails 201 and 202 by the reversible motor 115 which drives the shaft 125 through the belt 121 and the pulley 119 in a manner heretofore described with respect to FIG. 4 of the drawings.

Figure 9:
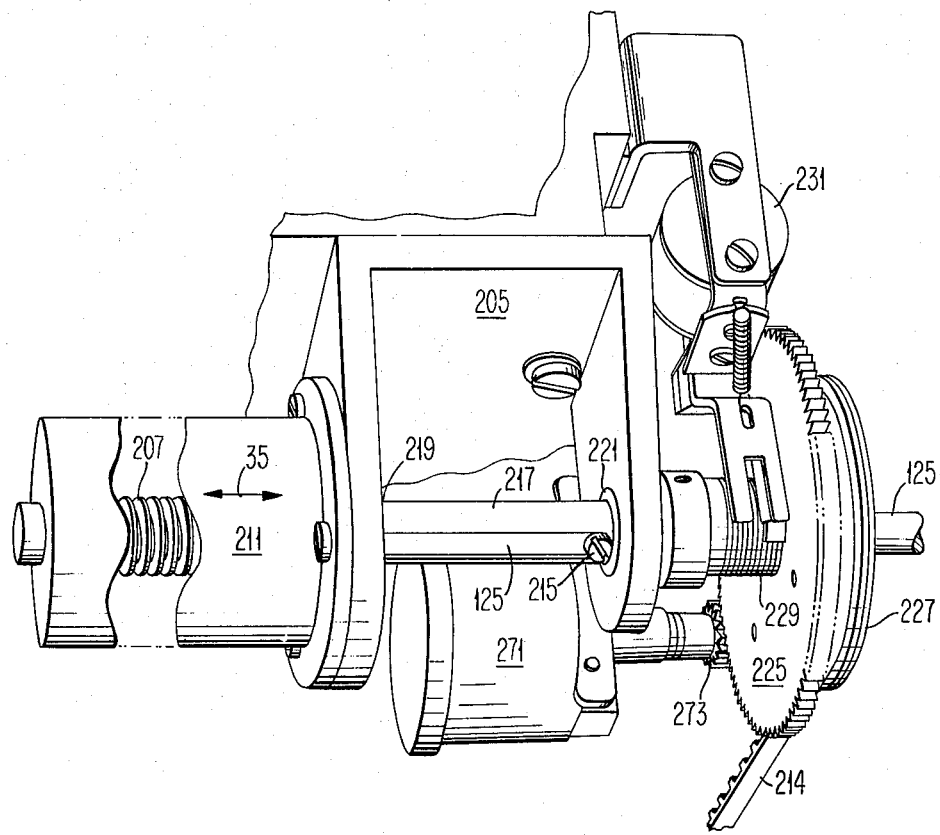
FIG. 9 is a rear view of a portion of the positionable carriage drive system.

Referring now to FIG. 9 of the drawings, a rear view of a portion of the positionable carriage drive system is depicted. Rotation of the shaft 125 causes rotation of the worm 207 at the end thereof causing the mating gear (not shown) intergral with the housing 211 to advance therealong in the direction of arrows 35, the direction of travel being dependent upon the direction of rotation of the shaft 125. The mating gear is connected through the housing 211 to the master carriage 205. Accordingly, rotation of the shaft 125 imparts translational motion to the master carriage 205 in the direction of arrows 35.

The rotation of shaft 125 also controls the vertical positioning of the lens carriage assembly 167 of FIG. 6 in the vertical direction of arrow 31. This motion is imparted from the shaft 125 to the belt 214 which in turn provides drive power to effect the vertical positioning of the lens. The following description sets forth the drive train between the shaft 125 and the belt 214.

The drive pin 215 is fixedly secured to the shaft 125 and imparts motion to the outer shaft 217 which is mounted on collars 219 and 221 of the master carriage 205. A slot 223 is located along the outer shaft 217 thereby allowing translational movement of the outer shaft 217 with respect to the drive pin 215 when the master carriage moves in the direction of arrows 35. The rotational movement of the outer shaft 217 is transmitted to the gear 225 and to the pulley 227 through the spring clutch 229. That is, whenever the spring clutch 229 is actuated through energization of the solenoid 231, the rotary motion of the outer shaft 217 effects corresponding rotational movement on the gear 225 and the pulley 227. The movement of the pulley 227 effects translational movement of the belt 214.

Referring now once again to FIG. 7 of the drawings, it has been described how rotational movement of the shaft 125 effects translation of the master carriage 205 in the direction of arrows 35. Additionally, it has been described how the shaft 125 imparts rotary motion to the outer shaft 217 which travels with the carriage 205. Further, it has been discovered how the motion of the outer shaft 217 is coupled through a spring clutch 229 to the drive gear 225 and a belt and pulley system (not shown) which rotate with the gear 225 in order to drive the lens 23 in the direction of arrows 31, in a manner which will hereinafter be described.

As noted heretofore, the lens 23 is also positioned in the direction of arrows 29 in accordance with the magnification mode selected. This positioning is achieved as the master carriage 205 translates in the direction of arrows 35 carrying therewith the guides 151 and 173 which are fixedly secured thereto. As has been described heretofore, the lens carriage assembly 167 is mounted on the guides 151 and 173 by roller members 169, 170, and 171 (FIG. 6) and by roller members 235. Accordingly, as the master carriage 205 translates in the direction of arrows 35, the roller surface 179 of the now fixedly positioned drive arm 147 contacts a different roller 181, 182, 183 (see FIG. 8) located on the lens carriage assembly 167. Since the rollers 181-183 are displaced from one another in the direction of arrow 29 (see also FIG. 8) and since the lens carriage 167 is biased against the now stationary drive arm 147 by the spring 185 and cable 187, the lens carriage assembly 167 moves in the direction of arrows 29 over the guides 151 and 173 as the master carriage 205 translates in the direction of arrows 35 with respect to the stationary drive arm 147. Accordingly, motion of the master carriage in the direction of arrows 35 simultaneously effects movement of the lens carriage assembly 167 in the direction of arrows 29 over the guides 151 and 173 which are fixedly secured to the master carriage 205.

Referring once again to FIG. 1 of the drawings, it has been described how the initial position of the lens 23 in the direction of arrows 29 and 35 is controlled by the output position of the reversible motor 115. It has also been described that the output position of the motor 115 also controls the position of the lens 23 in the direction of arrows 31 through a drive applied from the shaft 125 to the belt 214. In the description immediately following, it will be shown how the movement of the belt 214 controls the vertical position of the lens 23.

Referring now once again to FIG. 4 of the drawings, movement of the belt 214 about the pulley 227 effects rotary motion of the pulley 251 thereby effecting rotary motion of the gear 253 pinned thereto. The rotary motion of the gear 253 effects rotary motion of the pulley 255 through the belt 257 thereby rotating the flexible transmission cable 259. The flexible transmission cable 259 is coupled to a lens positioning system that is located on the reciprocating lens carriage assembly 167 of FIG. 7.

The flexible transmission cable 259 enables the lens carriage assembly to reciprocate with respect to the pulley 255 which is mounted on the master carriage 205. In order to prevent undue flexing of the flexible transmission cable 259 during the reciprocating scanning motion of the lens carriage assembly, pulleys 251 and 255 are mounted to a bracket 261 which pivots about pivots 263 and 265. That is, the pivots 263 and 265 are mounted on stationary brackets 267 and 269 which are in turn secured to the master carriage assembly 205. Thus, as the flexible transmission cable 259 exerts a force on the pulley 255 in the direction of arrows 271 during the reciprocating scanning motion of the lens carriage assembly, the bracket 261 carrying the pulley 255 and a secured end of the flexible transmission cable 259 pivots in the direction of arrows 273 about the pivots 263 and 265.

In order to prevent overly rapid translatory motion of the lens carriage assembly as it moves in a downward direction, a governor 271 is employed which is connected to the gear 273 which is in turn drivingly engaged by the gear 225. Since the pulley 227 is pinned to the gear 225, the governor 271 prevents overly rapid movement of the pulley 255 and the flexible transmission cable 259 coupled thereto.

Figure 10:
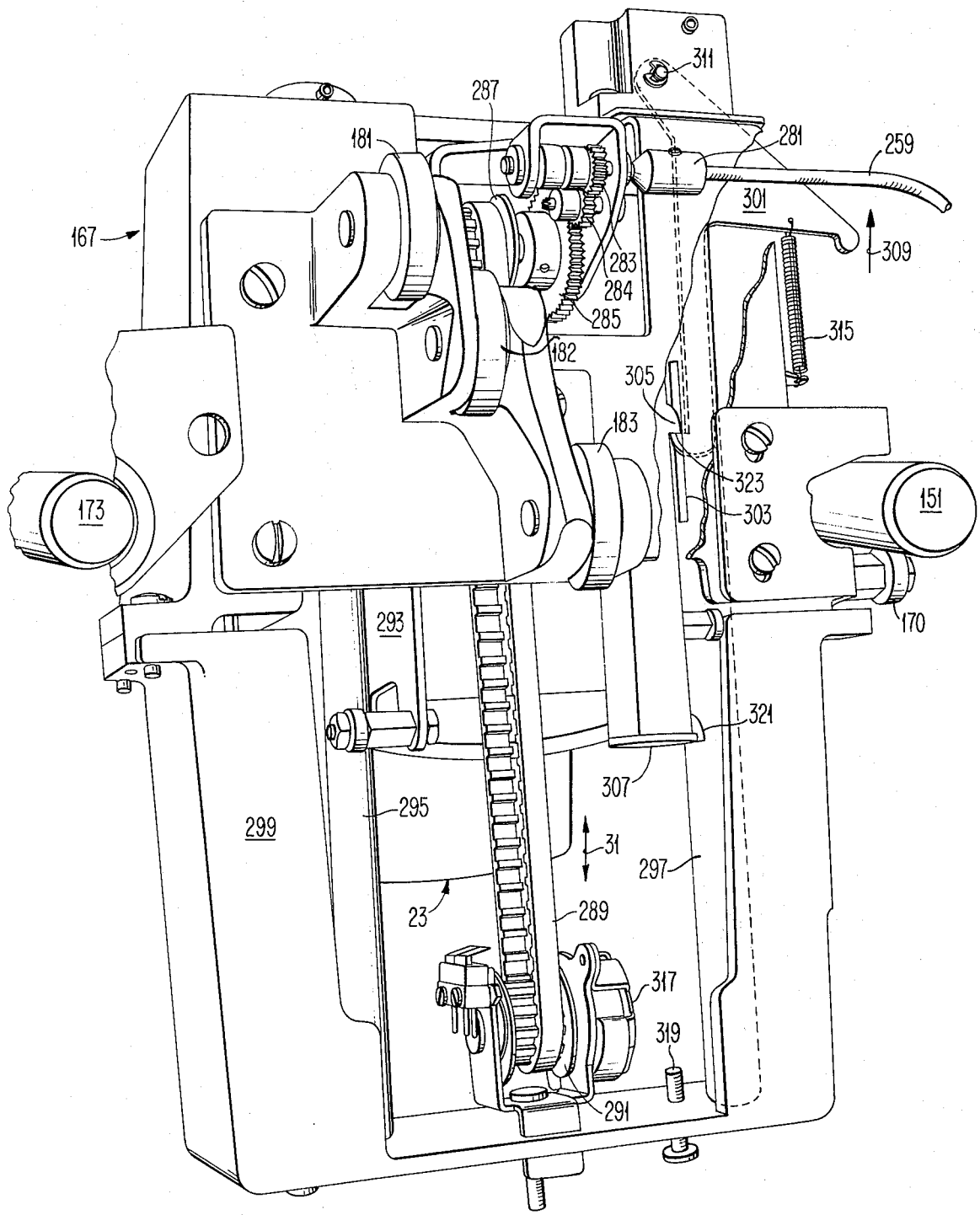
FIG. 10 is a rear isometric view of the lens carriage assembly.

Referring now to FIG. 10 of the drawings, a rear isometric view of the lens carriage assembly is depicted. Motion from the flexible transmission cable 259 effects motion of the lens 23 in the upward direction of arrows 31. The flexible transmission cable is coupled to the lens 23 through the coupler 281 and the transmission gears 283, 284, and 285. Rotation of the transmission gear 285 effects corresponding rotation of the pulley 287 thereby effecting motion of the belt 289 which travels about the lower pulley 291. The lens 23 is connected to a lens sub-carriage 293 which is fastened to the belt 289 for travel in the direction of arrows 31 over the guides 295 and 297.

The guides 295 and 297 are fixedly secured to the frame member 299 of the lens carriage assembly 167. Additionally, the roller members such as roller 170 are fixedly connected to the frame member 299. These roller members locate the lens carriage assembly 167 with respect to the guides 151 and 173 of the master carriage 205 of FIG. 1. Further, the rollers 181, 182, and 183 as well as the pulleys 291 and 287 are connected to the frame member 299.

A latch assembly 301 is employed to prevent the lens sub-carriage 293 from traveling in a downward direction of arrows 31 during normal scanning operations. The latch assembly 301 is mounted within the guide 297 and extends through a slot 303 thereof to engage surfaces 305 and 307 of the lens sub-carriage 293.

When, it is desirous to move the lens sub-carriage 293 in the downward direction of arrows 31 with respect to the frame member 299 of the lens carriage 167, the latch assembly 301 is momentarily pivoted in the direction of arrow 309 about the pivot 311 thereby disengaging the latch assembly 301 from the surface 305. The latch assembly 311 is thusly pivoted upon the energization of a solenoid (not shown) which causes the torque bar 313 of FIG. 1 to rotate the latch assembly upwardly against the bias of spring 315.

When the latch assembly no longer engages the surface 305, the lens sub-carriage 293 is free to fall in the downward direction of arrows 31 due to the force of gravity. Additionally, the action of the clock spring 317 biases the pulley 291 and the belt 289 so as to urge the lens sub-carriage attached to the belt 289 in a downward direction. The speed at which the lens sub-carriage moves in the downward direction is controlled since the belt 289 is connected back through the flexible transmission cable 259 to the governor 271 of FIG. 4. Assuming that the lens sub-carriage 293 is in the position depicted, downward motion thereof continues until the surface 307 engages the set screw stop 319.

When it is desirous to impart upward motion in the direction of arrows 31 to the lens sub-carriage 293, the solenoid 231 of FIG. 9 is energized thereby energizing the spring clutch 229 of FIG. 9 thus coupling the output rotation of the reversible motor 115 of FIG. 1 to the flexible transmission cable 259. Rotation of the flexible transmission cable 259 effects rotation of the pulley 287 thereby causing the belt 289 to travel against the bias of the clock spring 317 and drive the lens sub-carriage assembly 293 secured thereto in an upward direction. As the lens sub-carriage 293 moves in an upward direction from the position depicted in FIG. 10, the surface 321 cams the lower surface of the latch assembly 301 so that the latch assembly 301 pivots in the direction of arrow 309 about pivot 311. Drive motion continues until the surface 307 s past the latching surface 323 of the latch assembly 301. The latch assembly 301 then pivots in a direction opposite the direction of arrow 309. When the drive through the flexible transmission cable 259 is thereafter discontinued, the lens sub-carriage 293 moves in the downward direction of arrows 31 due to the force exerted thereon by gravity and by the clock spring 317 until the surface 307 engages the latching surface 323 at which time motion in the direction of arrows 31 ceases. It is noted that the spring clutch 229 of FIG. 9 is disengaged during the downward motion of the lens sub-carriage 293 thereby allowing the lens sub-carriage to move in the downward direction regardless of the output position of the reversible motor 115 of FIG. 1.

Figure 11:
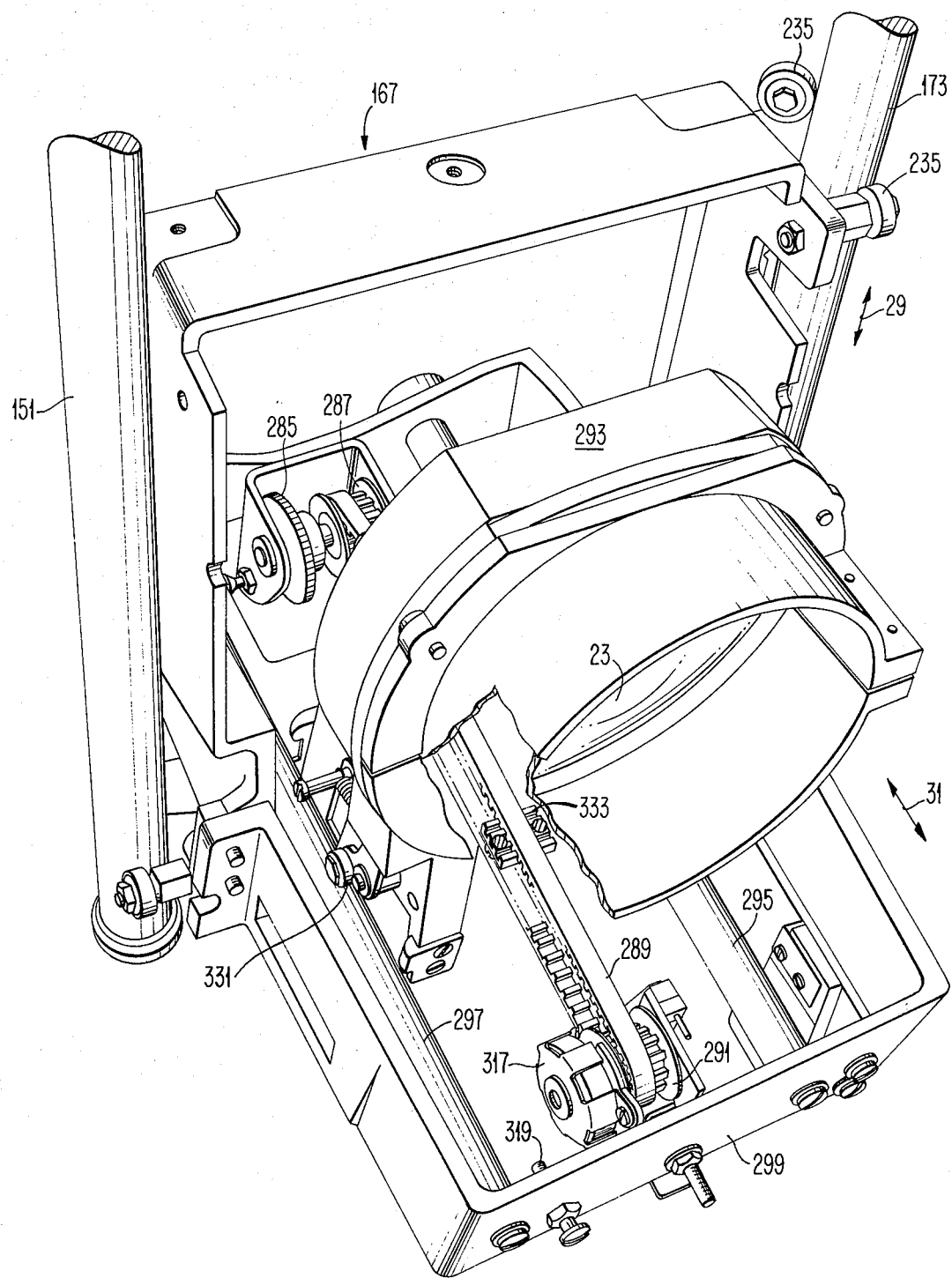
FIG. 11 is a front isometric view of the lens carriage assembly.

Referring now to FIG. 11 of the drawings, a front isometric view of the lens carriage assembly is depicted. As noted heretofore, the lens sub-carriage 293 having the lens element 23 secured thereto moves in the direction of arrows 31 over the guides 295 and 297 which are secured to the frame 299 of the lens carriage assembly 167. The lens sub-carriage 293 is constrained to motion in the direction of arrows 31 by rollers such as roller 331 which engage the guide 297. The belt 289 is fixedly secured to the lens of carriage 293 by the mounting brackets 333. As has been noted heretofore, the entire lens carriage 167 is reciprocated in the direction of arrows 29 during a scanning operation over the guides 151 and 173 which form a portion of the master carriage 205 of FIG. 1.

MIRROR POSITIONING

Referring once again to FIG. 1 of the drawings, it is thus far been described how the output position of a reversible motor 115 controls the selection of the scanning cams 75, 76, and 77 which in turn controls the velocity and final position of the moving reflector 65 of the moving illumination system 17. Additionally, it has been described how the output position of the reversible motor 115 controls the position of the lens 23 in the three coordinate directions of arrows 29, 31, and 35. Additionally, the output position of the reversible motor 115 further controls the position of the stationary mirrors 25 and 27, the position of which is changed in the direction of arrows 33 whenever there is a change in magnification ratio. The mirrors thereafter remain stationary during scanning operations.

Motion is imparted to the mirror carriage 351 upon rotation of the shaft 353 which effects corresponding rotation of the three cams 355, 357, and 359 which act upon corresponding cam followers 361, 363, and 365 attached to the mirror carriage 351. A corresponding plurality of cams (not shown) and cam followers (not shown) are located on the opposite end of the shaft 353.

Referring once again to FIG. 3 of the drawings, motion is imparted to the shaft 353 through the sprocket 367 which is driven by the chain 369. The chain 369 is driven upon rotation of a sprocket pinned to the shaft 83 which is in turn rotated by the sprocket 133. Drive to the sprocket 133 from the reversible motor 115 has been heretofore described with respect to the illumination system.

Referring now to FIG. 7 of the drawings, rotation of the shaft 353 controls which of the cams, 371, 373, or 375 acts on its corresponding cam follower 377, 379, or 381. The cam followers are secured to the mirror carriage 351 which moves in the direction of arrows 33 within the guide 383.

A bank of cams 385 and a corresponding bank of position switches 387 are utilized to sense the rotational position of the shaft 353. The switches 387 provide an electrical input to simple control logic which effects the energization of the reversible motor 115 of FIG. 1. Thus, the switches indicate the magnification mode which the optical system is in. Whenever it is desirous to change the magnification mode, the control logic (not shown) is provided with a signal indicating the desired magnification mode from a push button switch or the like (not shown) and is further provided with a signal from the switches 387 indicating the present magnification mode. The logic then controls the turn-on of the reversible motor 115 of FIG. 1 which rotates in the proper direction to effect the desired magnification change. Once the system is correctly positioned as indicated by the closure of an appropriate one of the switches 387, power to the reversible motor (and solenoid 231) is turned off.

Referring once again to FIG. 1 of the drawings, it has now been described how the velocity and final position of the moving illumination system 17, the position of the reciprocating lens system 19 in the coordinate positions of arrows 29, 31, and 35, and the position of the mirror carriage 351 containing the stationary mirrors 25 and 27 is set in accordance with the desired magnification mode. A single drive source comprising the reversible motor 115 is utilized to effect the precise positioning of these various optical components in accordance with the magnification mode selected.

Additionally, it has been described how the moving reflector 63 is reciprocated in the direction of arrows 21, how the lens 23 is reciprocated in the direction of arrows 29, and how the photoreceptive surface 15 is moved all under the control of a single drive source 71.

While the invention has been particularly shown and described with reference to a preferred embodiment thereof, it will be understood by those skilled in the art that the various changes in form and detail may be made therein without departing from the spirit and scope of the invention.

What is claimed is:

1. An optical scanning system for scanning a stationary object located on a planar object supporting surface and including a lens for projecting an image of the object to a moving photoreceptive surface moving at a constant velocity, and located at an image plane, said image being projected at a selected one of a plurality of magnifications and wherein the image is located at a fixed position with respect to the image plane regardless of the magnification selected comprising:

a first carriage for supporting a second carriage and positionable with respect to the image plane in at least a first direction to a selected one of a plurality of positions and including at least one guide member positionable therewith;

a second carriage movably mounted on said first carriage for reciprocal motion over a course defined by said guide member and positionable with respect to said first carriage in at least a second direction perpendicular to said first direction to a selected one of a plurality of positions, said second carriage supporting a subcarriage movably mounted thereon, said subcarriage supporting said lens and movable to a selected one of a plurality of positions in at least a third direction perpendicular to said first direction and to said second direction, one of said first, second and third directions being along the optical axis of the lens, conjugate path compensating means positionable to a selected one of a plurality of positions to maintain the projected image of the object at the same image plane for each of the positions of said lens along its optical axis;

magnification selection control means for selecting one of a plurality of magnification settings;

first drive means responsive to said magnification selection control mean for positioning said first carriage, said second carriage and said conjugate path compensating means in accordance with the magnification selected;

second drive means responsive to the motion of the photoreceptive surface and to the position of the lens along the optical axis for reciprocating said second carriage and said lens over said course at a linear velocity dependent upon said lens position and the velocity of said photoreceptive surface.

2. The optical scanning system set forth in claim 1 including:
 a movable light source for scanning said stationary object,
 a plurality of selectable drive means for driving said movable light source at a corresponding plurality of velocities,
 drive selection control means responsive to the magnification selection control means for selecting one of said selectable drive means in accordance with the magnification selected.

3. The optical scanning system set forth in claim 2 further including:
 a drive source,
 means connected to said drive source for moving said photoreceptive surface at said constant velocity;
 said plurality of selectable drive means including at least one first cam member driven by said drive source and a first cam follower resiliently urged against said cam member for driving said movable light source;
 said second drive means including a second cam member driven by said drive source and a second cam follower resiliently urged against said second cam member for reciprocating said second carriage;
 said first cam follower being driven in an uphill direction when said second cam follower being driven in a downhill direction thereby balancing the torque load on said drive source.

4. The optical scanning system set forth in claim 1 wherein said third direction being along said optical axis.

5. The optical scanning system set forth in claim 4 wherein said second drive means includes a drive arm pivotable about a pivot and means for pivoting said drive arm, said drive arm contacting said second carriage at a radial position extending from said pivot dependent upon the selected position of said subcarriage in said third direction for imparting reciprocal motion to said second carriage with a velocity dependent upon said constant velocity and said radial position.

6. The optical scanning system set forth in claim 5 wherein said second carriage includes a plurality of drive surfaces displayed from one another in said first and said third directions and wherein said drive arm contacts a selected one of said plurality of drive surfaces in accordance with the selected position of said first carriage.

7. The optical scanning system set forth in claim 6 wherein said plurality of drive surfaces further being displaced from one another in said second direction and further including biasing means for biasing said second carriage against said drive arm, said second carriage assuming said selected position in said second direction in accordance with the selected position of said first carriage.

8. The optical scanning system set forth in claim 1 wherein said first drive means includes a drive source and a driven member mounted to said frame of said second carriage for imparting motion to said subcarriage and a flexible drive connection connected between said drive source and said driven member, said flexible drive connection flexing when said second drive means reciprocates said second carriage.

9. The optical scanning system set forth in claim 1 wherein said conjugate path compensating means includes mirror means located in the optical path between the stationary object and the image plane for directing light rays therebetween and wherein said mirror means being positioned by said first drive means.

10. An optical scanning system for scanning a stationary object located on a planar object supporting surface and including a lens for projecting an image of the object to an image plane at a moving photoreceptive surface moving at a constant velocity, said image being projected at a selected one of a plurality of magnifications and wherein the image is located at a fixed position with respect to the image plane regardless of the magnification selected comprising:
 a first carriage for supporting a second carriage and positionable with respect to the image plane in a first direction perpendicular to the optical axis of the lens to a selected one of a plurality of positions and including at least one guide member fixedly secured thereto and positionable therewith;
 a second carriage movably mounted on the guide member of said first carriage for reciprocal motion over a course defined by said guide member in a scanning direction perpendicular to said first direction and said optical axis and including a subcarriage movably mounted thereon, said subcarriage supporting said lens and movable to a selected one of a plurality of positions to position said lens along the optical axis thereof;
 mirror means located in the optical path between the stationary object and the image plane for directing light rays therebetween and positionable to a selected one of a plurality of positions to maintain the projected image of the object at the same image plane for each of the positions of said lens along its optical axis;

magnification selection control means for selecting one of a plurality of magnification settings;

first drive means responsive to said magnification selection control means for positioning said first carriage, said second carriage, said subcarriage and said mirror means in accordance with the magnification selected;

second drive means responsive to the motion of the photoreceptive surface and to the position of the lens along its optical axis for reciprocating said second carriage and said lens over said course at a linear velocity dependent upon said lens position and the velocity of said photoreceptive surface.

11. The optical scanning system set forth in claim 10 including:

a movable light source for scanning said stationary object, a plurality of selectable drive means for driving said movable light source at a corresponding plurality of velocities, drive selection control means responsive to the magnification selection control means for selecting one of said selectable drive means in accordance with the magnification selected.

12. The optical scanning system set forth in claim 11 further including:

a drive source, means connected to said drive source for moving said photoreceptive surface at said constant velocity;

said plurality of selectable drive means including at least one first cam member driven by said drive source and a first cam follower resiliently urged against said cam member for driving said movable light source;

said second drive means including a second cam member driven by said drive source and a second cam follower resiliently urged against said second cam member for reciprocating said second carriage;

said first cam follower being driven in an uphill direction when said second cam follower being driven in a downhill direction thereby balancing the torque load on said drive source.

13. The optical scanning system set forth in claim 10 wherein said second drive means includes a drive arm pivotable about a pivot and a drive means for pivoting said drive arm, said drive arm contacting said second carriage at a radial position extending from said pivot dependent upon the selected position of said subcarriage for imparting reciprocal motion to said second carriage with a velocity dependent upon said constant velocity and said radial position.

14. The optical scanning system set forth in claim 13 wherein said second carriage includes a plurality of drive surfaces displaced from one another in said first direction and in the direction of said optical axis and wherein said drive arm contacts a selected one of said plurality of drive surfaces in accordance with the selected position of said first carriage.

15. The optical scanning system set forth in claim 14 wherein said plurality of drive surfaces further being displaced from one another in the direction of said scanning direction and wherein said second carriage being biased against said drive arm to assume a position in said scanning direction in accordance with the selected position of said first carriage.

16. The optical scanning system set forth in claim 15 wherein said drive arm includes a roller surface for contacting said drive surfaces.

17. The optical scanning system set forth in claim 16 wherein said drive surfaces each comprise a separate roller surface.

18. The optical scanning system set forth in claim 11 wherein said second drive means includes a drive arm pivotable about a pivot and a drive means for pivoting said drive arm, said drive arm contacting said second carriage at a radial position extending from said pivot dependent upon the selected position of said subcarriage for imparting reciprocal motion to said second carriage with a velocity dependent upon said constant velocity and said radial position.

19. The optical scanning system set forth in claim 11 further including:

a drive source;

means connected to said drive source for moving said photoreceptive surface at said constant velocity;

means connected to said drive source for driving said selectable drive means;

means connected to said drive source for driving said second drive means.

* * * * *